(12) United States Patent
Norwood

(10) Patent No.: US 11,807,405 B2
(45) Date of Patent: Nov. 7, 2023

(54) SPACECRAFT WITH UNIVERSAL TEST PORT

(71) Applicant: Maxar Space LLC, Palo Alto, CA (US)

(72) Inventor: Kristin Elisabeth Norwood, Mountain View, CA (US)

(73) Assignee: Maxar Space LLC, Palo Alto, CA (US)

( * ) Notice: Subject to any disclaimer, the term of this patent is extended or adjusted under 35 U.S.C. 154(b) by 523 days.

(21) Appl. No.: 17/083,004

(22) Filed: Oct. 28, 2020

(65) Prior Publication Data

US 2022/0127023 A1 Apr. 28, 2022

(51) Int. Cl.
| | |
|---|---|
| *B64G 1/66* | (2006.01) |
| *B64G 1/10* | (2006.01) |
| *B64G 1/24* | (2006.01) |
| *B64G 1/44* | (2006.01) |

(52) U.S. Cl.
CPC .......... *B64G 1/66* (2013.01); *B64G 1/1007* (2013.01); *B64G 1/1021* (2013.01); *B64G 1/244* (2019.05); *B64G 1/1028* (2023.08); *B64G 1/443* (2013.01)

(58) Field of Classification Search
CPC ...... B64G 1/66; B64G 1/1007; B64G 1/1021; B64G 1/244; B64G 1/443; B64G 2001/1028; B64G 1/428
See application file for complete search history.

(56) References Cited

U.S. PATENT DOCUMENTS

| | | | |
|---|---|---|---|
| 5,109,380 A | 4/1992 | Ogino | |
| 6,298,289 B1 * | 10/2001 | Lloyd | B64G 1/283 |
| | | | 701/13 |
| 9,501,061 B2 | 11/2016 | Canoy et al. | |
| 10,388,411 B1 * | 8/2019 | Dicks | H04L 67/565 |
| 2015/0180760 A1 | 6/2015 | Rickard | |
| 2017/0328678 A1 * | 11/2017 | Burke | F41G 7/36 |
| 2018/0348301 A1 * | 12/2018 | McKiernan | G01R 31/318342 |
| 2020/0018617 A1 * | 1/2020 | Cardalda-Garcia | |
| | | | G01C 21/165 |

FOREIGN PATENT DOCUMENTS

| | | | | |
|---|---|---|---|---|
| CA | 3018955 A1 * | 9/2017 | ............... | B64G 1/22 |
| CA | 3149788 A1 * | 3/2021 | ............. | C02F 1/008 |
| EP | 1970305 A2 * | 9/2008 | ............. | B64G 1/286 |

OTHER PUBLICATIONS

U.S. Appl. No. 17/022,550, filed Sep. 16, 2020.

* cited by examiner

*Primary Examiner* — Assres H Woldemaryam
(74) *Attorney, Agent, or Firm* — Vierra Magen Marcus LLP

(57) ABSTRACT

A universal test port is connected to the different functional sub-systems of a spacecraft, allowing the sub-systems to be tested from a single location of an assembled spacecraft. The universal test port is mounted on an external surface of the spacecraft and configured to connect to the different functional sub-systems (such as power, propulsion, and command and data handling, for example) of the assembled spacecraft, allowing for the streamlining of testing operations by electrical ground system equipment during assembly, integration, and test (AIT) operations and reducing the risk of collateral damage to spacecraft hardware during testing in AIT.

20 Claims, 9 Drawing Sheets

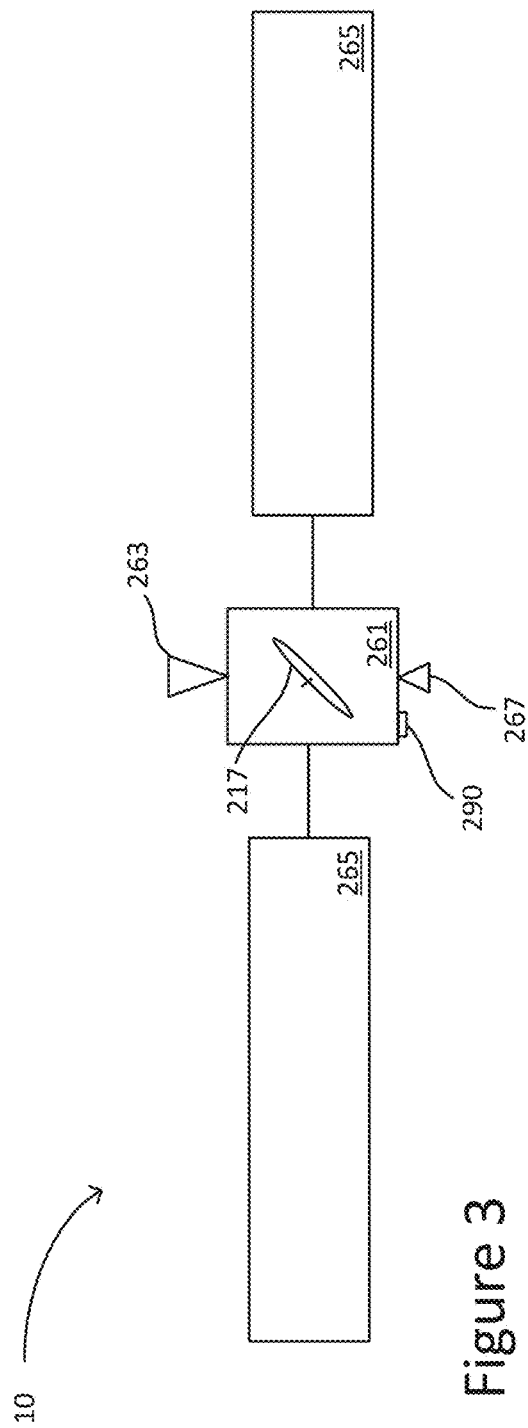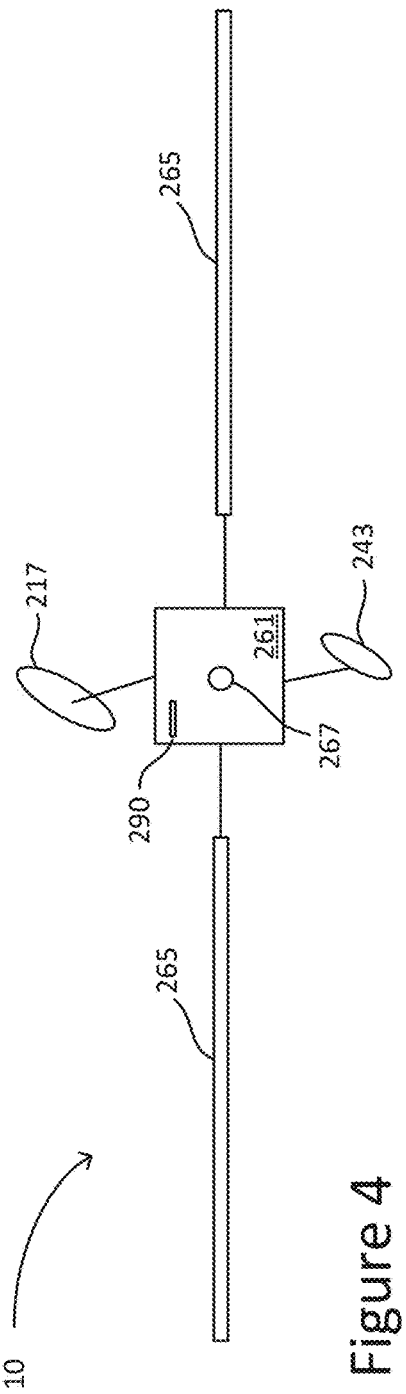

SPACECRAFT WITH UNIVERSAL TEST PORT

BACKGROUND

The number of space activities and the number of entities performing space activities has been increasing. For purposes of this document, space activities are functions performed completely or partially in space. The term "space" refers to being beyond the Earth's atmosphere, in orbit around the Earth, or at a distance from the Earth's surface that is equivalent to (or greater than) a distance of an object in orbit around the Earth. Examples of space activities include communication, transport, solar system exploration and scientific research. For example, the International Space Station is an orbiting research facility that functions to perform world-class science and research that only a microgravity environment can provide. Other activities performed in space can also be considered space activities.

Many services are provided by spacecraft. For example, satellites in geosynchronous orbit are used to provide communications (e.g., Internet Access, television broadcasts, telephone connectivity) and data gathering services (e.g., weather data, air traffic control data, etc.). Because longitudes ("slots") at which spacecraft may be stationed in geosynchronous orbit are limited, there is a strong market demand to maximize the revenue generated from each slot. As a result, satellites disposed in geosynchronous orbit have become larger, more complex and expensive, with satellite operators demanding higher power, more payload throughput, and multi-payload spacecraft. The cost to build and deploy such satellites has become increasingly expensive.

Due to the high cost of building and launching of spacecraft, and the difficulty or impossibility of making repairs once launched, modern spacecraft undergo extensive testing prior to being launched. Due to the complexity of spacecraft, these tests can be highly time consuming and expensive operations.

BRIEF DESCRIPTION OF THE DRAWINGS

FIGS. 3 and 4 illustrate two views of a spacecraft with a universal test port positioned on an external surface.

DETAILED DESCRIPTION

Figure 1:
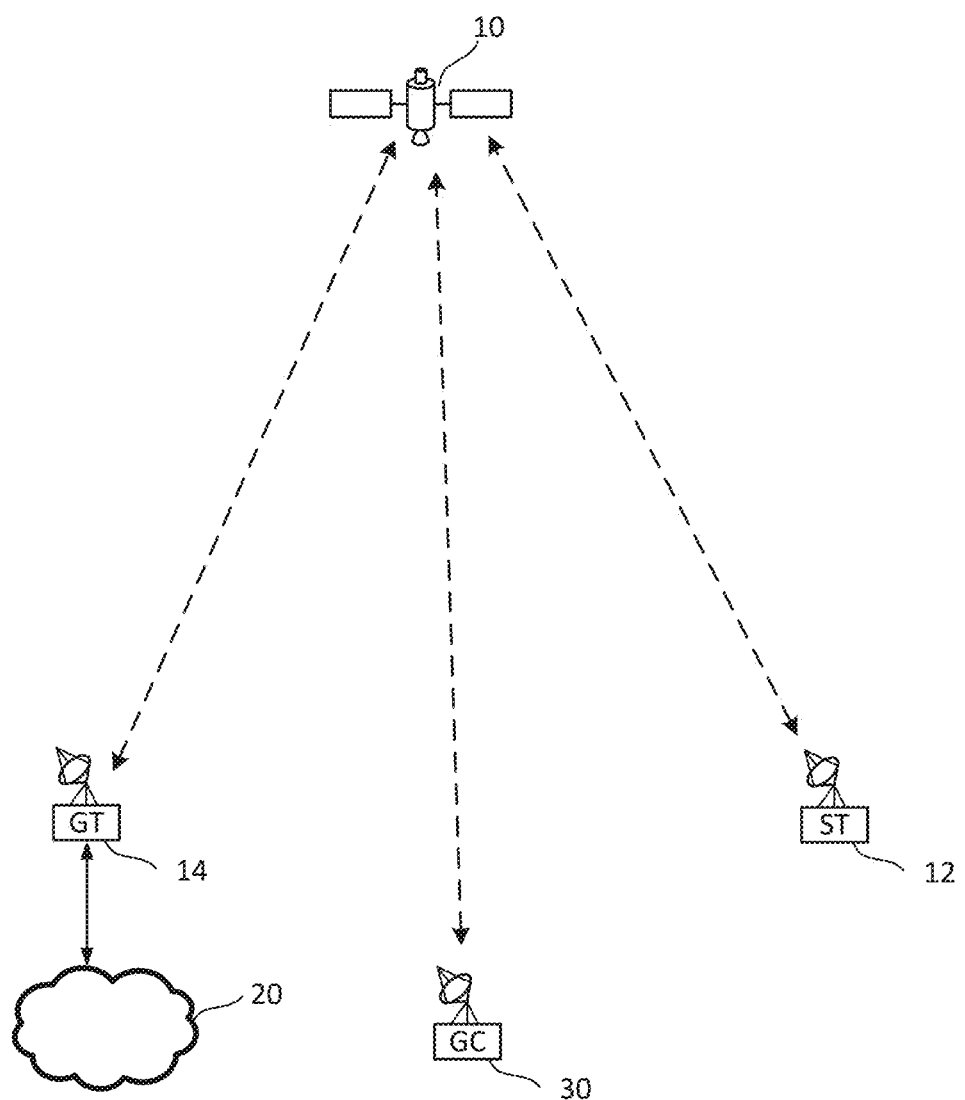
FIG. 1 is a block diagram of a spacecraft system.

A universal test port is connected to the different functional sub-systems of a spacecraft, allowing the sub-systems to be tested from a single location of an assembled spacecraft. The universal test port is mounted on an external surface of the spacecraft and configured to connect to the different functional sub-systems (such as power, propulsion, and command and data handling, for example) of the assembled spacecraft, allowing for the streamlining of testing operations by electrical ground system equipment during assembly, integration, and test (AIT) operations and reducing the risk of collateral damage to spacecraft hardware during testing in AIT.

In previous arrangements, the electrical connections used for testing are located at many different locations over the spacecraft, which takes time to rotate the spacecraft to install cable connections for testing. Oftentimes the connections are internal to the spacecraft, which adds risk of collateral damage to internal hardware since the connections are intrusive. When connections are internal to the spacecraft, it goes through several phases of breaking the flight configuration for testing, which then requires regression testing to be performed later as the spacecraft is reassembled to its flight configuration. By instead locating the electrical test connections on one externally accessible area of the spacecraft, the testing operations can be streamlined. The universal test port also eliminates the need to route cables to hardware internal to the spacecraft during the test process, reducing the risk of collateral damage to hardware and eliminating the need to break flight configuration of the spacecraft to establish the needed internal test connections. Additionally, the use of the external universal test port eliminates the need to re-validate flight mates during AIT since the flight configuration does not get broken to perform testing.

To implement the universal test port, electrical connections for the different functional sub-systems or modules of the spacecraft are routed to a common location (for example, on the "−Z" size) on the surface of the spacecraft for testing operations to validate performance throughout the different build phases. In some embodiments, testing devices, such as accelerometers or other sensors, can also be incorporated internally to the spacecraft during the construction process for use as part of the test processes. Relative to previous approaches, this approach results in internal cables and testing sensors being incorporated into the spacecraft's structure, increasing the spacecraft's mass, which is an important consideration in spacecraft design. The universal test port approach may involve incorporation into the early phases of the design process so that all of the needed sub-systems can have their testing cable routed to the universal test port during construction, whereas a spacecraft design may evolve over time and acquire more components that were not part of the original design. None the less, the incorporation of the described universal test port can more than offset these limitations as it allows for more efficient operations (routing cables to one location), as well as eliminating the need for regression testing since flight configuration is not broken reducing the risk of collateral damage during testing since cables are not routed over other hardware internal to the spacecraft.

FIG. 1 is a block diagram of a spacecraft system that can implement the technology proposed herein. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows satellite 10 to provide internet connectivity to a plurality of subscriber terminals (e.g., subscriber terminal 12) via gateway 14. Ground control terminal 30 is used to monitor and control operations of spacecraft 10. When reference is made to a specific embodiment for the spacecraft 10, the example of a communication satellite will often be used in the following, although the techniques are more widely applicable, including other or additional payloads such as for an optical satellite.

Figure 2:
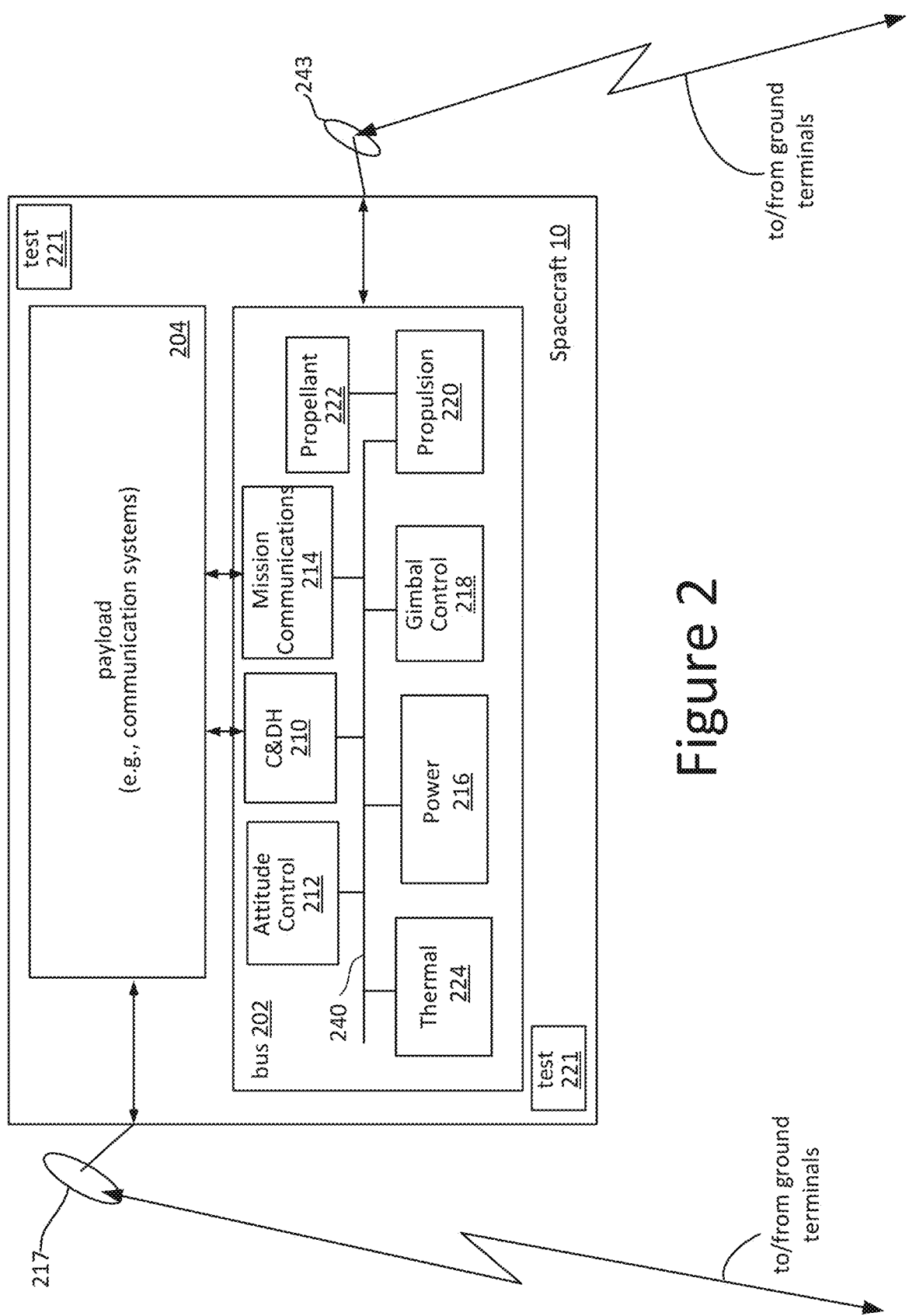
FIG. 2 is a block diagram of an example spacecraft.

FIG. 2 is a block diagram of one embodiment of spacecraft 10, which in one example (as discussed above) is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as a communication satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 210, attitude control systems 212, mission communication systems 214, power subsystems 216, gimbal control electronics 218, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when spacecraft is in operation. Also represented are an antenna 243, that is one of one or more antennae used by the mission communications 214 for exchanging communications for operating of the spacecraft with ground terminals, and a payload antenna 217, that is one of one or more antennae used by the payload 204 for exchanging communications with ground terminals, such as the antennae used by a communication satellite embodiment. The spacecraft can also include a number of test sensors 221, such as accelerometers that can used when performing test operations on the spacecraft. Other equipment can also be included.

The command and data handling module 210 includes any processing unit or units for handling includes command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for a communication satellite and includes an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

FIGS. 3 and 4 look an exterior view for an embodiment of spacecraft 10 in more detail. More specifically, FIGS. 3 and 4 show two views of an embodiment of spacecraft 10, where FIG. 4 shows the spacecraft rotated by 90° about the axis of the solar arrays 265 relative to FIG. 3. A number of different embodiments are possible, but the example of FIGS. 3 and 4 can be used to illustrate some of the elements relevant to the current discussion.

Referring to FIGS. 3 and 4, the spacecraft 10 includes a spacecraft body 261 from which extend two, in this example, deployed solar arrays 265. Attached to the body will also be one or more number of antennae 217 and 243 as described above, by which the satellite can receive and transmit signals. Depending on the particulars of the embodiment, a satellite may have a large number of antennae, but only a pair of antennae for exchanging signals with a ground station are shown. Attached to the satellite body 261 are a number of thrusters, as shown at 263 and 267, which typically include one or more main thrusters and a number of attitude and orbit control thrusters. Internal to the body will be the spacecraft's frame (not show) within which the functional sub-systems can be installed.

The deployed arrays 265 can include a solar array, a thermal radiating array, or both and include one or more respectively coplanar panels. The deployed arrays 265 can be rotatable by the gimbal control 218 about the longitudinal axis (the left-right axis in FIGS. 3 and 4), in order to achieve or maintain a desired attitude with respect to, for example, the sun. For embodiments in which the deployed arrays 265 include a solar array; the solar array may be articulable so as to be substantially sun facing. The deployed solar array 265 may be sized and positioned so as to generate substantially more power from sunlight than would be possible if the solar array was fixedly disposed on the body 261 of the spacecraft 10. For example, in some implementations, the solar array orientation may be rotatable about the longitudinal axis of the spacecraft 10 so that photovoltaic power generating surfaces of the solar array remains substantially sun facing.

Also represented in FIGS. 3 and 4 is a universal test port 290 located on an external surface of the spacecraft. In FIG. 3 the universal test port 290 is located on the lower ("−Z") external surface, which is on the outward-facing surface in the rotated view of FIG. 4. As discussed further in the following, the universal test port 290 is connected to the multiple ones of the functional sub-systems or modules illustrated in FIG. 2 by way of internal cables so that external text equipment for these sub-systems can be attached at this single location without opening up the spacecraft or running additional cables.

Figure 5:
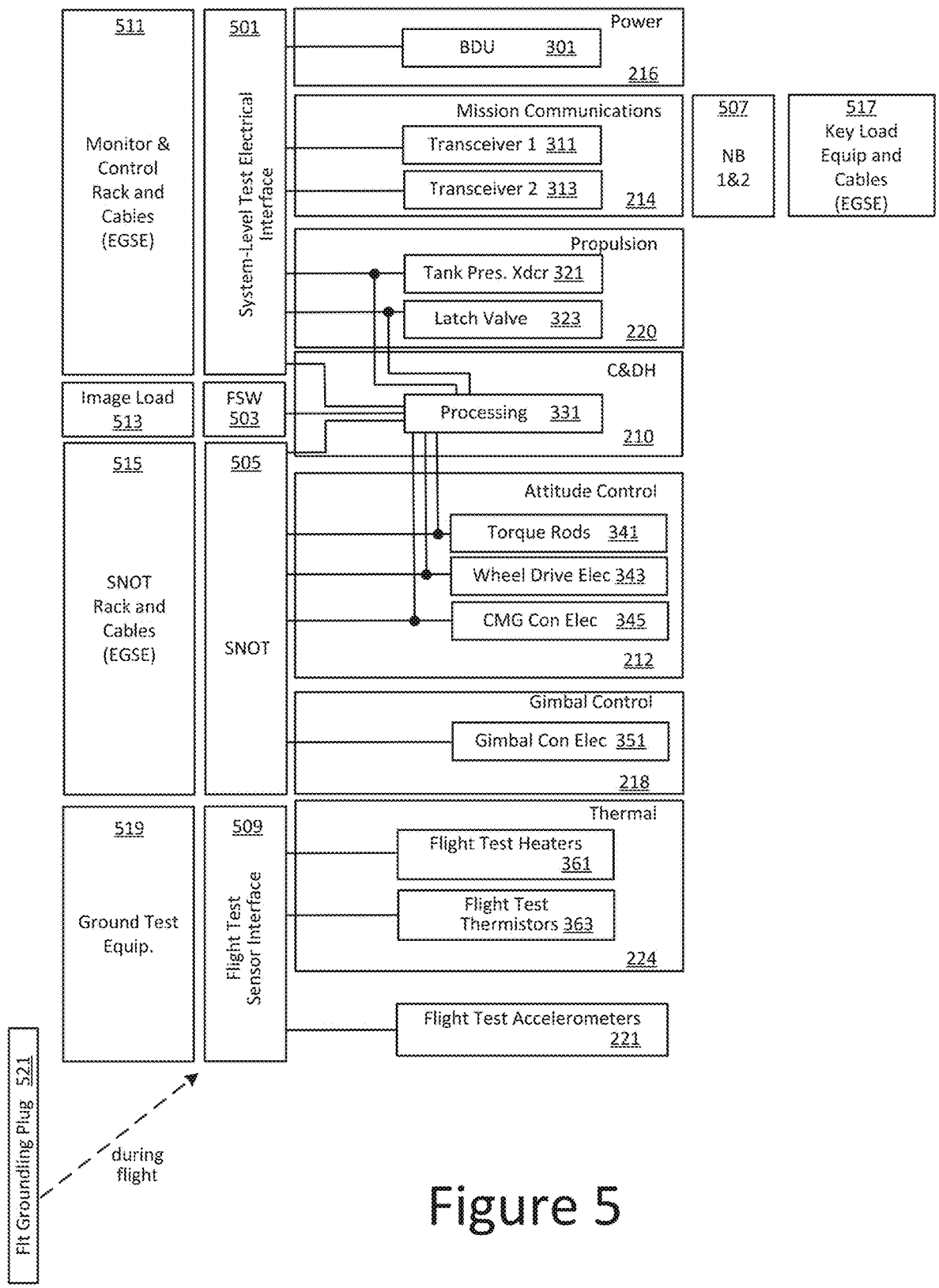
FIG. 5 is a block diagram of some of functional sub-systems and their connections to the universal test port.

FIG. 5 is a block diagram of some of functional sub-systems and their connections to the universal test port. The universal test port includes a mechanical interface where the external test equipment connects and an electrical interface for transferring the test signals between the functional sub-systems and the external test equipment. In the embodiment illustrated in FIG. 5, the universal test port includes a multiple connectors (501, 503, 505, 507, 509) into which the external cables of the external test equipment (511, 513, 515, 517, 519) can connect. Other embodiments can include more or fewer such connectors, including those illustrated in FIG. 7 as discussed below. FIG. 5 explicitly represents some components of the shown sub-systems, but it will be understood that these are just examples and each of the sub-system can include different or additional elements.

A first connector of the universal test port is a system-level test electrical interface 501. In this embodiment, the system-level test electrical interface 501 is connected to the electrical system of the power sub-system 216, where the component of a battery disconnect unit BDU 301 is represented and is connected the system-level test electrical interface 501 by an internal buffered battery test jumper cable. The electrical systems of the mission communications sub-system 214 is represented by a pair of narrow band transceivers 311 and 313 that are connected to the system-level test electrical interface 501 by internal cables to receive command and telemetry test data. The propulsion sub-system 220, which will include both the mechanical systems of the propulsion sub-system as well as the electrical system for controlling them, includes a tank pressure transducer 321 connected to the system-level test electrical interface 501 over an internal cable to receive transducer power and telemetry test data and a latch valve 321 connected to system-level test electrical interface 501 by the internal cables to receive open/close telemetry data. The system-level test electrical interface 501 is also connected the processor section 331 to transfer command, processing, and telemetry test data. The processor section 331 represents the electrical systems for the processing capabilities of the command and data handling section 210 and can include multiple processing sections, memory, and other components for control and operation of the spacecraft. For testing purposes, the processor section 331 is also connected by cabling to the tank pressure transducer 321 and latch valve 323. For electrical testing of the spacecraft's electrical system, the system-level test electrical interface 501 is connected to the monitor and control rack and cables electrical ground system equipment (EGSE) 511.

The command and data handling section 210 is also connected to flight software (FSW) image interface 503. This allows image load equipment and cables EGSE 513 to load or update an image of the flight software to the processor section 331 for use in the mission.

A system normal operation test (SNOT) connector 505 is connected to attitude control sub-system 212, which in the represented embodiment includes torque rods 341 connected by internal cabling to receive and return drive test data, wheel drive electronics 343 connected to receive torque and polarity data, and control momentum electronics 345 connected to receive command and test data. The attitude control sub-system 212 will include both the mechanical elements as well as the electrical systems for controlling these mechanical elements. The internal test cabling to the torque rods 341, wheel drive electronics 343, and control momentum electronics 345 also connect to the processor section 331 for testing. The processor section 331 is also connected to SNOT connector 505 to receive flight simulation data, including simulation data injected for magnetometers, sun sensors, and other sensors used by the command and data handling sub-system 210. The SNOT connector 505 is also connected by internal cabling to the gimbal control electronics 351 to exchange test commands and data, where the gimbal control electronics 351 control the mechanical gimbal control elements, such as actuators and servos. For testing of the spacecraft's normal flight operations, SNOT rack and cables EGSE 515 can then be connected to the SNOT connector 505.

The universal test port can also include a narrow band receiver key connector 507 that be used to load encryption keys for the narrowband receivers 311, 313. Key load equipment and cables EGSE 517 can then load such encryption over connector 507.

The connections illustrated in FIG. 5 correspond to the internal test cabling introduced to connect the functional sub-systems to the universal test port for use in the test process. The components described so far in FIG. 5 are also interconnected over the flight harness or the wiring connecting the functional sub-systems of the spacecraft as part of the communication network 240 of FIG. 2 for use when the spacecraft is in operation. The spacecraft can also include sensors incorporated into the spacecraft during its construction that will fly with the spacecraft, but that are not connected to the flight harness (i.e., not connected to the functional sub-systems); rather, these sensors are incorporated for use in the test process and not directly utilized by the spacecraft itself. For this purpose, the universal test port can include test flight interface 509 for the connection of ground test equipment 519 to these test sensors. Examples of the test sensors can include flight test accelerometers 221 and, within the thermal sub-system 224, flight test heaters 361 and flight test thermocouples/thermistors 363. FIG. 5 also illustrates flight groundling plug 521 that, once testing is done or the universal test port is not in use, can serve as a cap to cover and protect the connectors 511, 513, 515, 517, and 519 of the universal test port.

Figure 6:
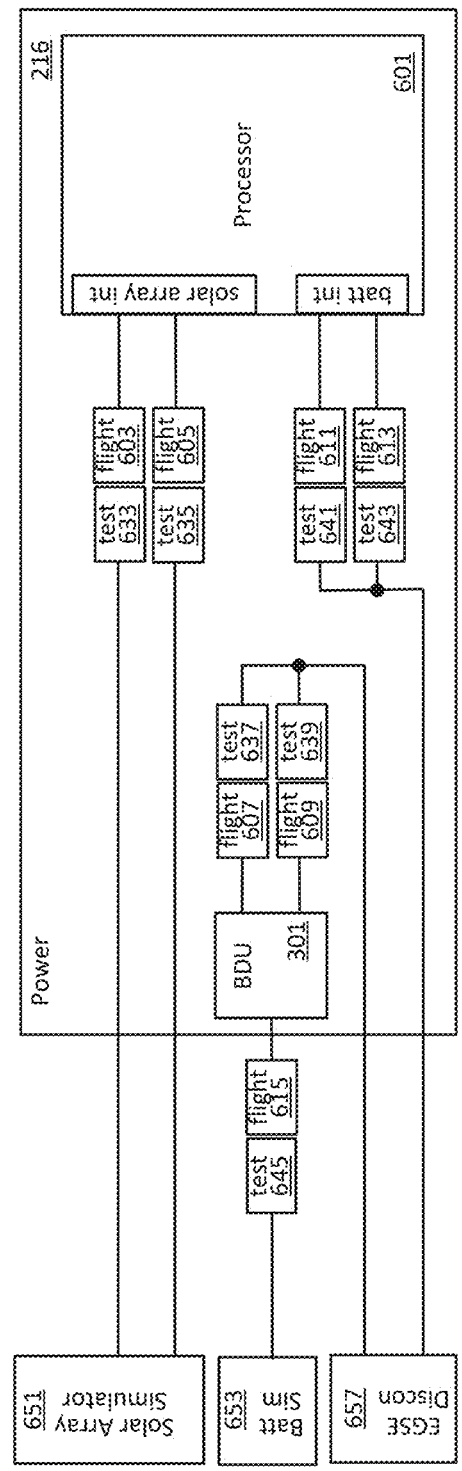
FIG. 6 is a more detailed block diagram of a power sub-system and the connections of some of its elements during a test process.

FIG. 6 is a more detailed block diagram of the power sub-system 216 and the connections of some of its elements during a test process. Among the test equipment are a solar array (S/A) simulator 651 to provide test signals similar to what might be provided from the spacecraft's solar arrays under different conditions, a battery simulator 653 to test response to different battery conditions, and an EGSE disconnect 657 that can allow the disconnection of components of the power sub-system to avoid stress during the test processes. In addition to the battery disconnect unit BDU 301, a processor 601 for the power sub-system 216 includes a solar array interface and a battery interface. FIG. 6 illustrates the connectors within the system-level electrical interface EGSE 511 in the universal test port as the "flight" connectors and the corresponding connectors of the S/A simulator 651, battery simulator 653, and EGSE disconnect 657 within the monitor and control rack and cables EGSE as "test" connectors. Although shown as arranged in different positions within the representation of FIG. 6, as implemented within universal test port the flight connectors can be part of a single multi-pin connector, as would the test connections on the test equipment side.

During a test operation for a solar array simulation, the S/A simulator exchanges test signals with the solar array interface of processor 601 over the connector pairs 633/603, 635/605. Similarly, the battery simulator 653 connects to the battery disconnect unit 301 by way of the connector pair 645/615. The battery disconnect unit 301 can in turn connect/disconnect the spacecraft batteries or the battery simulator 653 to the battery interface of the processor 601, wherein the test process the EGSE 657 can use the connector pairs 607/637, 609/639, 611/641, 613/643 to disconnect the battery disconnect unit 301 from the battery interface of the processor 601 to avoid stress during battery tests.

Figure 7:
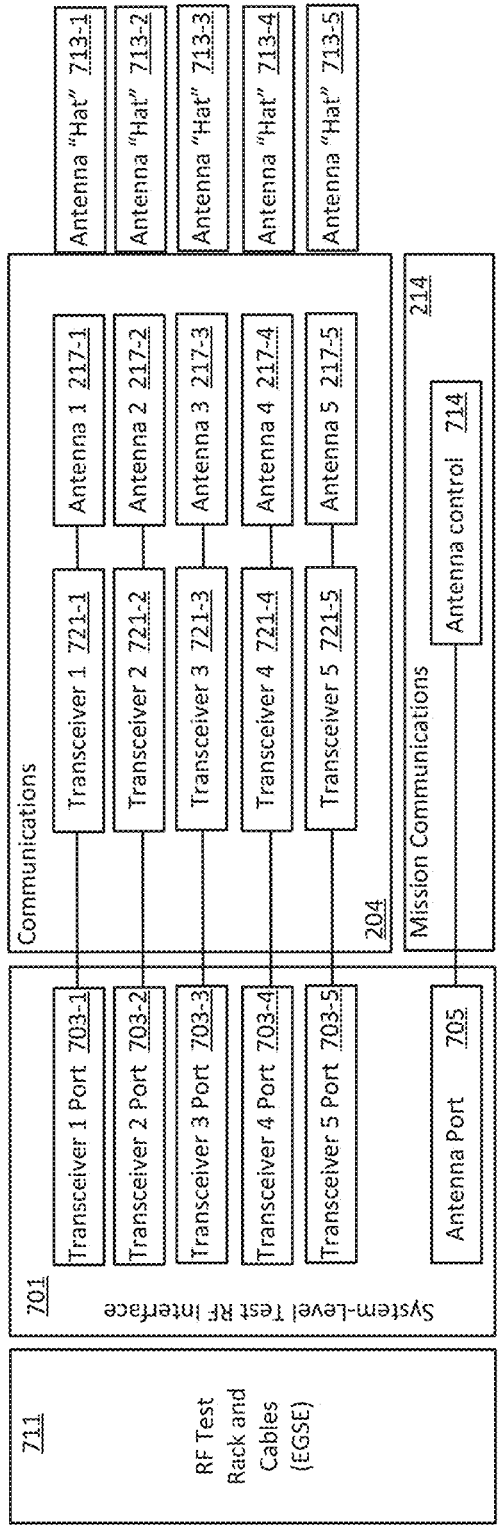
FIG. 7 illustrates additional functional sub-systems connectable to test equipment through the universal test port, in this case for testing the radio frequency (RF) transceivers in a communications satellite embodiment.

FIG. 7 illustrates additional functional sub-systems connectable to test equipment through the universal test port, in this case for testing the radio frequency (RF) channels in a communications satellite embodiment. In the case of a communication satellite the payload 204 will include communication channel electronics such as a number transceivers, where five are shown in this example: 721-1, 721-2, 721-3, 721-4, and 721-5. Each transceiver 721-i is here connected to a corresponding antenna 217-i, such as represented by the single shown antenna 217 of FIG. 2. Although referred to here as transceivers, each of 721-i can be a receiver, transmitter, or transceiver and the other electronics typically included in a communication satellite are not shown to simplify the discussion. To test the payload's operation, the universal test port includes a system-level test RF interface 701 with a test port 703-i connected by a pair of internal RF test cables to the corresponding transceiver 721-i. Also as part of the RF system testing, an antenna test port 705 is also connected by a pair of RF test cables to an antenna control block 714 of the mission communications sub-system, which can receive commands for handling of the payload and control of the antennae 217-i.

The ground equipment for the RF testing is represented at RF test cables and rack 711. This will include the test equipment and the external cables and connectors to attach to the system-level test RF interface 701. The main embodiment discussed here is that of a communication satellite, that is subjected to RF testing, but other payloads will have differing sets of tests and, correspondingly, differing test interfaces incorporated into the universal test port. Returning to continue with the communication satellite example, in order to test the functions of the RF sections, the output signals generated by receivers/transceivers 721-i and transmitted by the antennae 217-i are monitored by a corresponding antenna covering structure, or "hat", 713-i that can be placed over the antenna to collect the output signals and supply these to the RF test equipment in the racks of 711 or simply absorb RF transmissions to provide a safe working environment for personnel. During the testing for the reception of RF signals, the antenna hats 713-i can similarly supply test inputs to the antennae 217-i for testing of receiver functions. In the case of other or additional payloads, other corresponding test equipment can used, such as, for example, testing the operations of an optical payload.

Figure 8:
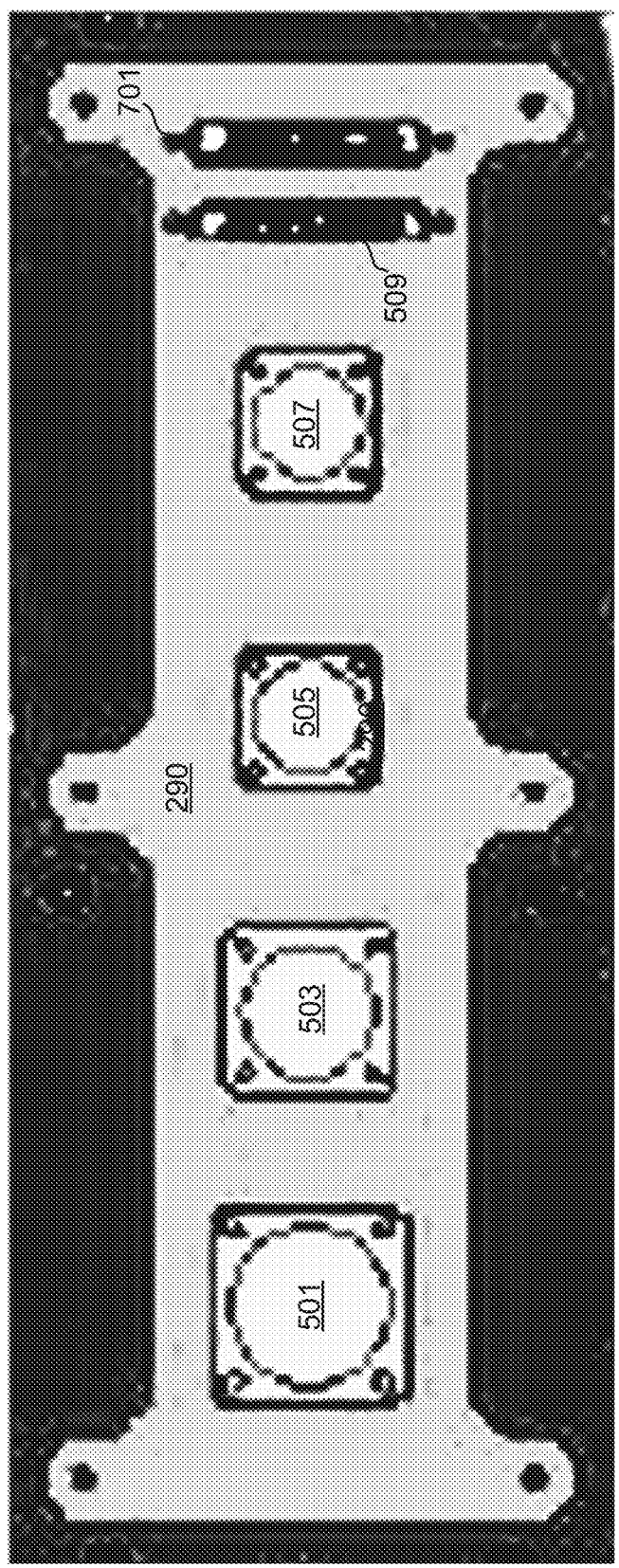
FIG. 8 is a schematic representation for an embodiment of the universal test port.

FIG. 8 is a representation for an embodiment of the universal test port 290, where the black background corresponds to a surface of the spacecraft. The universal test port includes connectors for testing the multiple ones of the different functional sub-systems by different test equipment. For the embodiment illustrated in FIGS. 5-7, this can include connectors for the system-level test electrical interface 501, flight software (FSW) image interface 503, system normal operation test (SNOT) connector 505, narrow band receiver key connector 507, test flight interface 509, and a system-level test RF interface 701. Each of these connectors can include a mechanical interface configured to engage the test equipment to the corresponding connector of the universal test port to exchange signals over the corresponding electrical interface between the test equipment and the sub-systems being tested. A number different types and differing form factors are known in the art for such connectors and their pin configurations and any appropriate such connector can be used.

Although the universal test port has been described in the context of ground testing performed as an initial set of tests before a space craft is deployed, these tests or portions of these tests can be performed at various times during the spacecraft's construction. For example, flight software can be loaded or updated over FSW image interface 503 at various times once the other sub-system tests have been completed. Additionally, even once a spacecraft is launched the universal test port could be accessed by a servicing spacecraft to perform diagnostics or update software, for example.

Figure 9:
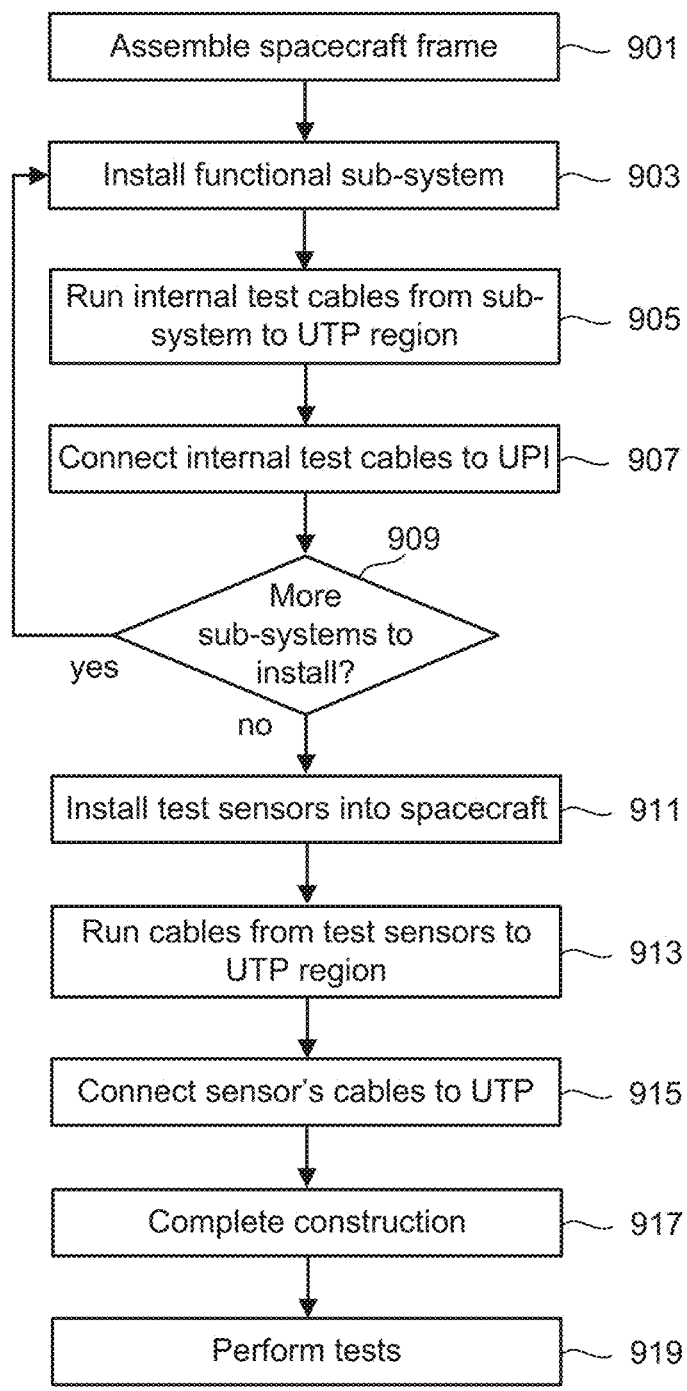
FIG. 9 is a flow chart describing one embodiment of assembling a spacecraft with a universal test port.

FIG. 9 is a flow chart describing one embodiment of assembling a spacecraft with a universal test port. For purposes of discussion, the steps of FIG. 9 are presented in a particular order, but as discussed further below many of these steps can be done in other orders, concurrently, or in an overlapping manner. At step 901 the spacecraft's frame, or a portion of this frame, is assembled, allowing for the installation of the functional sub-systems to begin.

At step 903 a functional sub-system is installed into the spacecraft and the corresponding test cabling is routed to the region of the universal test port (UTP) at 905, with the cabling being connected to the universal test port at step 907. Step 909 determines whether there are more functional sub-systems are to be installed and, if so, the flow loops back to 903 for installation of additional functional sub-systems; and, if not, the flow continues on to step 911. With respect to the loop of steps 903, 905, and 907, it will be understood that different ones of the functional sub-systems, or portions of these sub-systems, will often be installed in a overlapping manner and that the routing and connection of the cabling may be overlapped or performed outside of the loop structure. For example, the installation and cable routing for the power sub-system 216, propulsion sub-system 220, control and data handling sub-system 210, and mission communication sub-system 214 may all be going on at the same time, with the test cables being routed as convenient to the region where the universal test will be located and the connections the universal test port completed after it has been mounted on an exterior surface of the space craft. Additionally, the order of performing the connections of the test cabling to the universal test port may need to accommodate that the relationship between universal test port connectors and functional sub-systems is not 1-to-1: for example, as shown in FIG. 5, a single connector (e.g., SNOT connector 505) can connect to multiple functional sub-systems (C&DH 210 and attitude control 212); and, conversely, a single functional sub-system (e.g., C&DH 210) can connect to multiple connectors (SNOT 505 and FSW image 503).

At step 911, test sensors such as accelerometers 221, flight test heaters 361, and flight test thermistors 363, are installed. As discussed above, these can be sensors installed within the spacecraft for testing purposes and that are otherwise not connected to the command and data handling sub-system 210 or other functional sub-systems of the spacecraft, even though these test sensors and their cabling is part of the completed space craft. The cabling for these sensors is routed at step 913 and connected to the universal test port at step 915. Although FIG. 9 presents steps 911, 913, and 915 after steps 903, 905, and 907, in practice the sensors would be installed and connected as convenient during the construction process. The flow of FIG. 9 concludes at step 917 with any remaining assembly being completed, after which testing can be performed at step 919.

Figure 10:
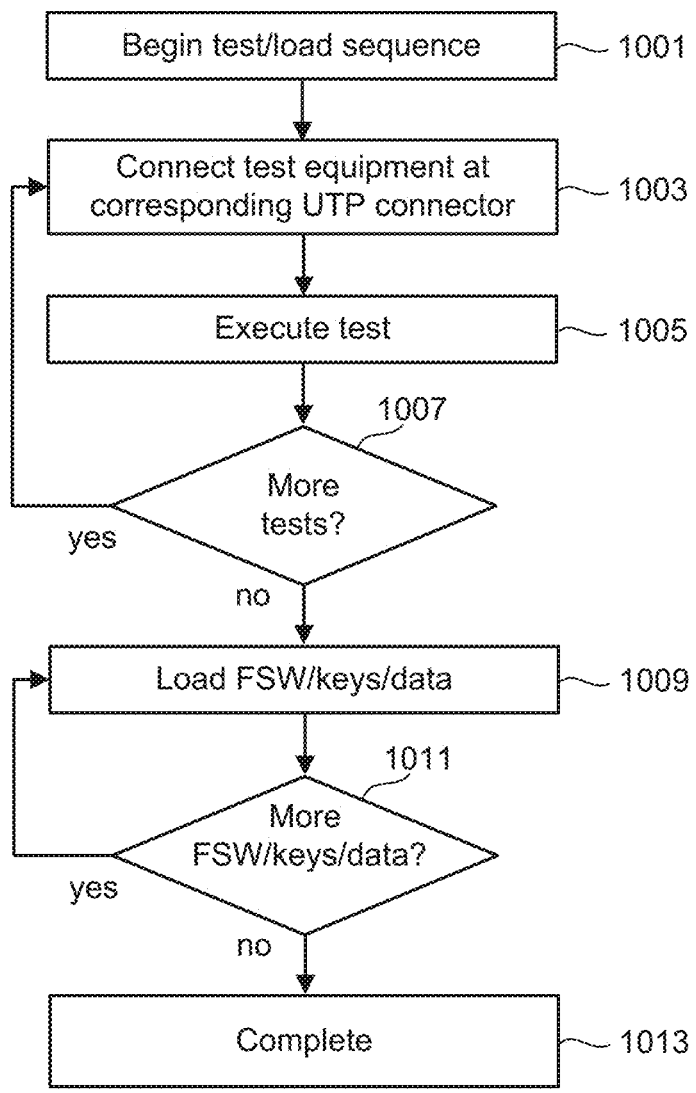
FIG. 10 is a flow chart describing one embodiment of a test process for spacecraft with a universal test port.

FIG. 10 is a flow chart describing one embodiment of a test process for spacecraft with a universal test port. Once again, for purposes of discussion, the steps of FIG. 10 are presented in a particular order, but as discussed further below many of these steps can be done in other orders, concurrently, or in an overlapping manner. Additionally, although presented as part of a test/load sequence performed prior to the launch of the spacecraft, elements of the flow can also be performed subsequently, such as a diagnosis or flight software update performed on an orbiting communication satellite by a servicing satellite. For any of the embodiments, a test/load sequence can begin at step 1001.

At step 1003 the test equipment for one or more sets of tests are connected, with the test equipment being used connected at the corresponding connector of the universal test port. Depending on the embodiment, one or multiple sets of tests may be performed at the same time; and depending on the tests being performed, multiple set of test equipment may be connected for a given test. For example, when testing the processor 331 of the command and data handling module 210, a test sequence may use the control rack and cables electrical ground system equipment (EGSE) 511, the image load equipment and cables EGSE 513, and SNOT rack and cables EGSE 515 all concurrently connected at the system-level test electrical interface 501, flight software image interface 503, and the SNOT connector 505, respectively. The tests are then executed at step 1005. Step 1007 determines whether there are more tests to be performed and, if so, the flow loops back to step 1003 to make the appropriate connections and perform the tests; and, if not, the flow goes on to step 1009.

At step 1009, firmware/keys/data are loaded onto the spacecraft. For instance, this can include flight software loaded onto the processor 331 via the FSW image connector 503 or encryption keys loaded onto the transceivers 311 and 313 via the narrow band receiver key connector 507. If more loading remains, the flow loops back from step 1011 to step 1009, while if complete the flow stops at step 1013. Although presented as later steps in FIG. 10, the loading of step 1009 can occur, during, or after the earlier numbered test steps. For example, some amount of software may need to be loaded prior to testing.

One embodiment includes a spacecraft having a plurality of electrical systems, including power control circuitry, command circuitry, and mission communication circuitry. A test port is positioned on an external surface of the spacecraft, the test port configured to connect to and exchange electronic test signals with a plurality of external equipment systems. A plurality of internal cables connect the test port and plurality of electrical systems, where the internal cables configured to transfer the electronic test signals from the external equipment systems between the test port and the plurality of electrical systems.

One embodiment includes a method comprising: installing a plurality of functional sub-systems connected over an internal communication network into a spacecraft; running a plurality of internal test cables from the plurality of functional sub-systems to a region of an exterior surface of the spacecraft, the internal test cables being distinct from the internal communication network and configured to transfer electronic test signals between the plurality of functional sub-systems and external test equipment systems; and connecting the internal test cables to a test port located at the region of the exterior surface, the test port configured to transfer the electronic test signals between the external test equipment and the internal test cables.

One embodiment includes a spacecraft comprising a plurality of functional sub-systems and an internal communication network connecting the plurality of functional sub-systems. The spacecraft also includes one or more test sensors not connected to the internal communication network and a test port positioned on an external surface of the spacecraft, the test port configured to connect to and exchange electronic test signals with a plurality of external equipment systems. A plurality of internal test cables connect the test port to the plurality of functional sub-systems and to the test sensors, the internal test cables being distinct from the internal communication network and configured to transfer the electronic test signals from the external equipment systems between the test port and the plurality of functional sub-systems and the test sensors.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A spacecraft, comprising:
a plurality of electrical systems, including power control circuitry, command circuitry, and mission communication circuitry;
a test port positioned on an external surface of the spacecraft, the test port comprising a plurality of mechanical interfaces for connecting to and receiving electronic test signals from a plurality of external test equipment systems to perform tests on the plurality of electrical systems; and
a plurality of internal cables connecting the test port and plurality of electrical systems to transfer the electronic test signals received from the external test equipment systems at the test port to the plurality of electrical systems.

2. The spacecraft of claim 1, further comprising:
one or more test sensors connected to the test port, and not connected to the plurality of electrical systems, the test sensors configured to exchange electronic test signals with one or more of the plurality of external test equipment systems through the test port.

3. The spacecraft of claim 2, wherein the test sensors include one or more accelerometers, test heaters, or thermocouples.

4. The spacecraft of claim 1, further comprising:
a payload connected to the test port by the internal cables to exchange electronic test signals with one or more of the plurality of external test equipment systems to perform tests on the payload.

5. The spacecraft of claim 4, wherein:
the spacecraft is a communication satellite,
the payload includes a plurality of radio frequency (RF) channels, and
the electronic test signals include test signals for the RF channels.

6. The spacecraft of claim 5, wherein the payload includes a plurality of antennae and the external test equipment systems include a plurality of antenna covering structures configured to receive RF signals transmitted from the antennae.

7. The spacecraft of claim 4, wherein:
the spacecraft is an optical imaging satellite,
the payload includes one or more imaging systems, and
the electronic test signals include test signals for control systems of the one or more imaging systems.

8. The spacecraft of claim 1, wherein:
the test port and the internal cables are further configured to transfer software from the external test equipment systems to the command circuitry.

9. The spacecraft of claim 1, wherein:
the test port and the internal cables are further configured to transfer encryption keys from the external test equipment systems to the mission communication circuitry.

10. The spacecraft of claim 1, wherein the electronic test signals include signals for testing a solar array of the power control circuitry.

11. The spacecraft of claim 1, wherein the electronic test signals include signals for testing a battery of the power control circuitry.

12. The spacecraft of claim 1, wherein the plurality of electrical systems further includes electrical component of an attitude control sub-system and a gimbal control sub-system.

13. The spacecraft of claim 1, wherein the plurality of electrical systems further includes electrical component of a propulsion control sub-system.

14. The spacecraft of claim 1, further comprising:
an internal communication network over which the plurality of electrical systems are connected, wherein the internal communication network is distinct from the internal cables.

15. A method, comprising:
installing a plurality of functional sub-systems connected over an internal communication network into a spacecraft;
running a plurality of internal test cables from the plurality of functional sub-systems to a region of an exterior surface of the spacecraft, the internal test cables being distinct from the internal communication network and connected to the plurality of functional sub-systems to transfer electronic test signals received from external test equipment systems to the plurality of functional sub-systems to perform tests on the plurality of functional sub-systems; and
connecting the internal test cables to a test port located at the region of the exterior surface, the test port comprising a plurality of mechanical interfaces for connecting to and receiving the electronic test signals from the external test equipment and supplying the electronic test signals to the internal test cables.

16. The method of claim 15, further comprising:
installing one or more test sensors into the spacecraft; and
connecting the one or more test sensors to the test port, but not the internal communication network, the one or more test sensors configured to exchange electronic test signals with one or more of the plurality of the external test equipment systems through the test port.

17. The method of claim 15, further comprising:
subsequent to connecting the internal test cables to the test port, connecting one or more of the plurality of the external test equipment systems to the test port and performing a sequence of tests by exchanging electronic test signals over the test port.

18. The method of claim 15, wherein the plurality of functional sub-systems includes a command sub-system and the method further comprises:
subsequent to connecting the internal test cables to the test port, connecting one or more of the plurality of the external test equipment systems to the test port and transferring software over the test port from the external test equipment systems to the command sub-system.

19. The method of claim 15, wherein the plurality of functional sub-systems includes a mission communication sub-system and the method further comprises:
subsequent to connecting the internal test cables to the test port, connecting one or more of the plurality of the external test equipment systems to the test port and transferring encryption keys over the test port from the external test equipment systems to the mission communication sub-system.

20. A spacecraft, comprising:
a plurality of functional sub-systems;
an internal communication network connecting the plurality of functional sub-systems;
one or more test sensors not connected to the internal communication network;
a test port positioned on an external surface of the spacecraft, the test port comprising a plurality of mechanical interfaces for connecting to and receiving electronic test signals from a plurality of external test equipment systems to perform tests on the plurality of functional sub-systems; and a plurality of internal test cables connecting the test port to the plurality of functional sub-systems and to the test sensors, the internal test cables being distinct from the internal communication network and connected to transfer the electronic test signals received from the external test equipment systems at the test port to the plurality of functional sub-systems and to the test sensors.

* * * * *